United States Patent [19]
Enokida et al.

[11] Patent Number: 4,707,020
[45] Date of Patent: Nov. 17, 1987

[54] BODY STRUCTURE OF A MOTOR VEHICLE HAVING EXTERIOR PANELS MADE OF SYNTHETIC RESINS

[75] Inventors: Susumu Enokida; Jun Ono, both of Utsunomiya, Japan

[73] Assignee: Honda Giken Kogyo Kabushiki Kaisha, Tokyo, Japan

[21] Appl. No.: 886,494

[22] Filed: Jul. 15, 1986

[30] Foreign Application Priority Data

Jul. 16, 1985 [JP] Japan .................................. 60-155086
Jul. 25, 1985 [JP] Japan .................................. 60-163015
Aug. 2, 1985 [JP] Japan ............................ 60-118138[U]

[51] Int. Cl.$^4$ ............................................. B62D 27/02
[52] U.S. Cl. .................................... 296/191; 296/31 P
[58] Field of Search ....................... 296/31 P, 191, 199

[56] References Cited

U.S. PATENT DOCUMENTS 4,529,244 7/1985 Zaydel ................................ 296/31 P
4,607,878 8/1968 Itoh .................................... 296/31 P Primary Examiner—Robert R. Song
Attorney, Agent, or Firm—Armstrong, Nikaido, Marmelstein & Kubovcik

[57] ABSTRACT

A body structure of a motor vehicle having exterior panels at least one of which is made of synthetic resin is disclosed. The resin panel or panels are each fixed at one side thereof to a rigid member which provides the vehicle body with mechanical strength. Another side of the resin panel which faces the fixed side is retained in a slidable manner. An end portion of the slidable side of the resin panel is offset in the inward-outward direction of the vehicle body relative to an end portion of a nearby exterior panel. In this construction, thermal expansion of the resin panel is effectively accommodated.

12 Claims, 9 Drawing Figures

BODY STRUCTURE OF A MOTOR VEHICLE HAVING EXTERIOR PANELS MADE OF SYNTHETIC RESINS

BACKGROUND OF THE INVENTION

The present invention relates to an exterior panel structure of a motor vehicle and, more particularly, to a body structure of a motor vehicle having exterior panels which are made of synthetic resins.

In the art of motor vehicles, there is an increasing demand for a light-weight body structure which cuts down fuel consumption. One of expedients heretofore proposed to reduce the weight of a vehicle body is forming various structural parts out of synthetic resins. Incidentally, the use of synthetic resins for producing vehicle parts eliminates the need for measures against corrosion.

However, the problem with synthetic resins is that due to a coefficient of thermal expansion which is greater than that of steel it undergoes significant expansion and contraction depending upon the temperature, affecting designed dimensions of products. For this reason, the application of synthetic resins in a vehicle body has customarily been limited to those parts located inside a vehicle cabin which are small in area and subjected to relatively small temperature variations, a covering of a bumper which may be arranged with some clearance defined between itself and a vehicle body, etc.

To further promote a light-weight design of a vehicle body, however, it is desirable that the application of synthetic resins be extended even to fender panels, door panels and other large-size exterior panels. It is especially desirable from anticorrosion standpoint that those panels at the sides of a vehicle body which easily rust due to chipping and other causes be made of synthetic resins.

Exterior panels of a motor vehicle need to be surely mounted so as not to come off or warp when subjected to vibrations of a vehicle body, temperature variations, etc. To meet this demand, exterior panels are usually fixed along all of their edges to rigid members which are adapted to ensure mechanical strength of the vehicle body. Even exterior panels made of synthetic resins, therefore, may be fixed to rigid members along all of their edges.

However, exterior panels of a motor vehicle are significantly susceptive to variations of the ambient temperature. Where exterior panels are made of synthetic resins and dimensioned to serve as, for example, door outer panels of a two-door vehicle, the dimension of each panel in the longitudinal direction of the vehicle is changed by about 6 millimeters from the most expanded condition to the most contracted condition. Moreover, because each exterior panel has a substantial area, the expansion and contraction occurs not in one direction only but two-dimensionally.

Meanwhile, rigid members to which external panels are mounted are generally made of steel or fiber-reinforced plastics. Such materials, compared to synthetic resins usable for exterior panels, shows a small coefficient of linear expansion to heat.

Where an exterior panel made of synthetic resin is fixed along all of its edges to a rigid member which is made of a different material as discussed above, it undesirably undulates when the ambient temperature is high and cracks along fixed portions thereof when the temperature is low.

It is therefore a prerequisite that exterior panels made of synthetic resins be mounted to a vehicle body in a special manner which accommodates changes in the dimensions of the panels. One approach to meet this prerequisite is allowing a panel mounted on a rigid member to slide in a plane thereof and, yet, preventing it from coming off the rigid member. In such a case, an arrangement is made such that expansion and contraction of the panel are accommodated by edge portions of the panel.

A problematic situation which arises here is that edge portions of an exterior panel are usually joined to those of other exterior panels, lamps, a hood and others adjacent thereto. An attempt to arrange an exterior panel made of synthetic resins in the same plane as nearby exterior panels as has been the case with traditional steel panels results in the need for a clearance between the neighboring panels which is large enough to accommodate changes in the dimensions of the resin panel, so the resin panel may be prevented from being abutted against and damaged by the other panels when expanded most. Especially, for a door outer panel or like exterior panel associated with an openable member, it is necessary that a clearance of about 5 millimeters be constantly defined between the openable edge of the panel, i.e., rear edge in the case of a front-hinge type door and the front edge of a rear fender panel or the like which neighbors the former, taking account of scattering of the whole vehicle body configuration, errors particular to door hinge mounting steps, errors in door lock mechanisms, warps due to aging, etc. Therefore, if an arrangement is made in such a manner as to accommodate expansion of the door outer panel made of synthetic resin at the portion in question, the clearance will become as great as about 11 millimeters when the panel is contracted in cold weather. It follows that where a rear fender panel, too, is made of synthetic resin, an extra clearance needs to be defined between the door outer panel and the rear fender panel in order to accommodate variations in the dimensions of the rear fender panel, resulting in a considerable clearance in total.

Such a clearance between nearby exterior panels would critically degrade the appearance of a motor vehicle while allowing externally derived noise to enter the vehicle cabin.

SUMMARY OF THE INVENTION

It is therefore an object of the present invention to surely mount an exterior panel made of synthetic resin to a vehicle body and, yet, accommodate expansion and contraction of the panel due to temperature variations.

It is another object of the present invention to absorb dimensional changes of an exterior panel of a vehicle body which is made of resin due to temperature variations while allowing a minimum of clearance to be developed between that exterior panel and another exterior panel.

It is another object of the present invention to allow a front fender panel made of synthetic resin to be joined to lamps such as head lamps and combination lamps, a front grill, edges of a hood, and others without any trouble.

It is another object of the present invention to maintain a substantially constant clearance between a door outer panel made of synthetic resin and a rear fender panel or like exterior panel which neighbors the door outer panel despite any change in the dimensions of the door outer panel due to temperature variations.

It is another object of the present invention to prevent a front fender panel made of synthetic resin and a door outer panel adjacent to the front fender panel and also made of synthetic resin from affecting each other when individually changed in dimensions due to temperature variations.

It is another object of the present invention to accommodate two-dimensionally the expansion and contraction of an exterior panel made of synthetic resin due to temperature variations.

It is another object of the present invention to cause a rear fender panel made of synthetic resin to hold a predetermined positional relationship with a door which is positioned before the rear fender panel and, yet, allows no clearance to be developed between the rear fender panel and a rear lamp which is positioned after the rear fender panel.

In order to achieve the above objects, in accordance with the present invention, an exterior panel made of resin is fixed at one side thereof and in a direction perpendicular to that side to a rigid member which is adapted for mechanical strength, and retained at a side opposite to the fixed side slidably in a direction perpendicular to the fixed side. An end portion of the slidable side is offset in the inward-outward direction of a vehicle body relative to an end portion of another exterior panel which neighbors the slidable side.

Because the slidable end portion of the resin panel is offset relative to a nearby exterior panel, the resin panel is allowed to expand and contract in a plane which is different from that of the nearby panel. In this condition, the resin panel is prevented from abutting against the nearby panel when expanded most and, thus, a minimum of clearance between the neighboring panels suffices. Further, the resin panel may overlap the nearby panel to make the clearance therebetween zero.

In a specific embodiment of the present invention, a front fender panel made of synthetic resin is fixed to a vehicle body at a front end portion thereof and slidably retained at a rear end portion. The slidable rear end portion of the panel is offset in the inward-outward direction of the vehicle body relative to a front end portion of a door outer panel which neighbors the front fender panel. In this construction, expansion and contraction of the front fender panel due to temperature variations are absorbed at the slidable rear end portion, so the panel is held in a predetermined relation to lamps, a front grill, edges of a hood and others which are situated in a front part of the vehicle body.

In another specific embodiment of the present invention, a front-hinge type door which neighbors a front fender panel includes a door outer panel made of synthetic resin. The door outer panel is fixed to a door inner panel at a rear end portion thereof and slidably retained at a front end portion. The slidable front end portion is offset in the inward-outward direction of a vehicle body relative to a rear end portion of the front fender panel. Expansion and contraction of the door outer panel due to temperature variations are absorbed by the slidable front end portion thereof, eliminating the fear of the panel interfering with a rear fender panel or the like at the rear end when the door is opened and closed. Hence, the clearance between the door outer panel and the rear fender panel or the like may be reduced to a minimum one.

In another specific embodiment of the present invention, both of a front fender panel and a door outer panel which neighbor each other are made of resins. The front fender panel is fixed to a vehicle body at a front end portion thereof and slidably retained at a front end portion. The rear end portion of the front fender panel and the front end portion of the door outer panel which are slidable are offset in the inward-outward direction of a vehicle body relative to each other. In this condition, expansion and contraction of each of the panels due to temperature variations are absorbed at the joining portion of the panels, the panels thus being prevented from affecting each other. In addition, because such expanding and contracting end portions concentrate in the joining portion of the two panels, attractive appearance of the vehicle body is ensured.

In another specific embodiment of the present invention, two contiguous sides of an exterior panel made of resin are each fixed to a rigid member in such a manner as to be unmovable in a direction perpendicular thereto. Other portions of the panel are retained slidably in mutually perpendicular directions. In this construction, the two contiguous sides of the panel are prevented from expanding and contracting in the directions perpendicular thereto, thereby ensuring accurate mating of the panel with other members. Expansion and contraction of the resin panel due to temperature variations are accommodated two-dimensionally by the slidably retained other portions. It follows that even resin exterior panels having substantial areas can be surely mounted to a vehicle body while deformation thereof due to temperature variations is prevented.

In another specific embodiment of the present invention, a rear lamp located next to a rear end portion of a rear fender panel which is made of synthetic resin includes a cover. The cover in turn is extended forwardly along the resin panel to overlap the rear end portion of the resin panel. The rear end portion of the resin panel is retained slidably by a rigid member of a vehicle body. Expansion and contraction of the panel due to temperature variations are accommodated by the slidable end portion of the panel which neighbors the lamp. In addition, no clearance is developed between the resin panel and the lamp since the end portion of the panel overlaps the extension of the cover. Such allows a front end portion of the panel to be fixed in place so as to maintain an optimum relationship between the panel and a door which is positioned before the panel.

DESCRIPTION OF THE PREFERRED EMBODIMENTS

Figure 1:
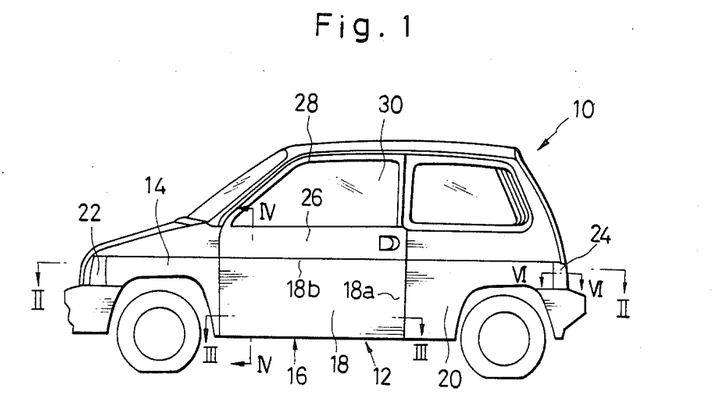
FIG. 1 is a side elevation of a motor vehicle having exterior panels made of synthetic resins in accordance with the present invention.

Referring to FIG. 1 of the drawings, a motor vehicle to which the present invention is applicable is shown and generally designated by the reference numeral 10. The vehicle 10 is shown to be of a two-door type by way of example. Each side of the vehicle 10 is constituted by a front fender panel 14, an outer panel 18 of a door 16, and a rear fender panel 20. The door 16 is hinged to a body 12 of the vehicle 10 at the front edge thereof to be openable at the rear edge.

Front lamps 22 such as headlights and clearance lamps are mounted on opposite sides of the front end of the vehicle body 12. Extending from the front end to the side of the vehicle body 12, each front lamp 22 terminates at a position adjacent to the front fender panel 14. Mounted on opposite sides of the rear end of the vehicle body 12 are rear combination lamps 24 each consisting of a turn signal lamp, a tail lamp and others. Extending from the rear end to the side of the vehicle body 12, each rear lamp 24 terminates at a position adjacent to the rear fender panel 20.

Figure 2:
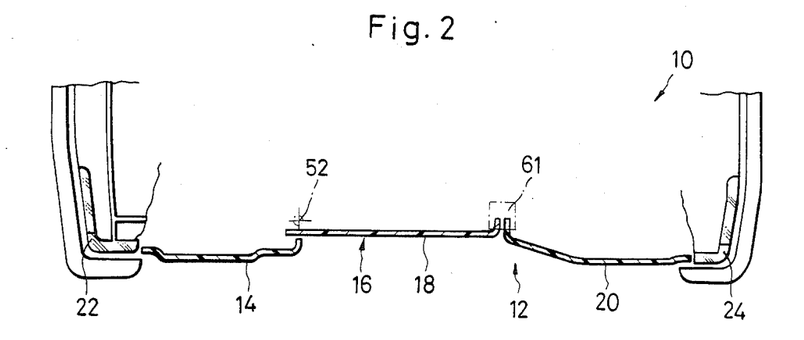
FIG. 2 is a fragmentary horizontal section taken along line II—II of FIG. 1.

The front fender panel 14, door outer panel 18 and rear fender panel 20 are made of synthetic resins. As shown in FIG. 2, a rear end portion of the front fender panel 14 is offset outwardly of the vehicle body 12 relative to a front end portion of the door outer panel 18. Further, the rear end portion of the panel 14 and the front end portion of the panel 18 overlap each other. The rear edge of the door outer panel 18 and the front edge of the rear fender panel 20 face each other with a small clearance defined therebetween.

As shown in FIG. 1, a reinforcing member 26 is situated on the top of the door outer panel 18 to extend in the longitudinal direction of the vehicle body 12. The member 26 is formed by shaping a steel sheet in a hollow box-like configuration. A window sash 28 is joined to the member 26. In this construction, the member 26 serves to provide the door 16 with rigidity against torsional forces while ensuring a fit between the door 16 and a window glass 30.

Figure 3:
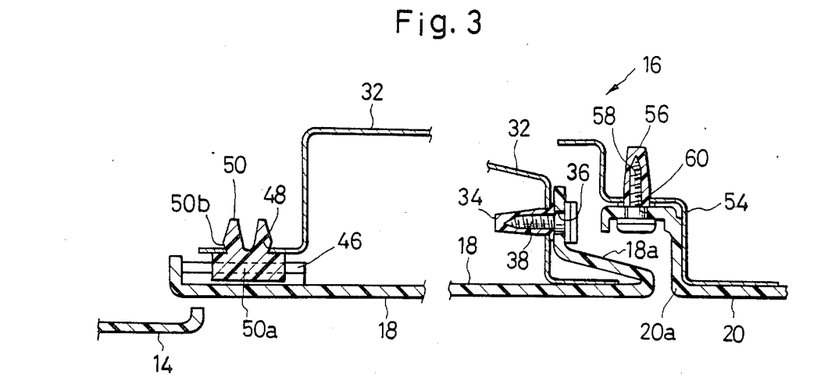
FIG. 3 is an enlarged horizontal section taken along line III—III of FIG. 1, showing a door and its associated members.

As shown in FIG. 3, the rear end side 18a of the door outer panel 18 is fastened at several vertically spaced locations thereof to a rigid door inner panel 32 which is implemented with a steel sheet. Specifically, a screw grommet 34 is fitted to the door inner panel 32 while the door outer panel 18 is formed with an opening 36. A stepped tapping screw 38 is driven into the screw grommet 34 through the opening 36 to thereby fix the door outer panel 18 to the door inner panel 32. Upper ones of such openings 36 of the panel 18 are formed as circular holes and lower ones as vertically elongate slots. This allows a lower portion of the panel rear end side 18a to move in the vertical direction but not in the longitudinal direction of the vehicle body 12.

Figure 4:
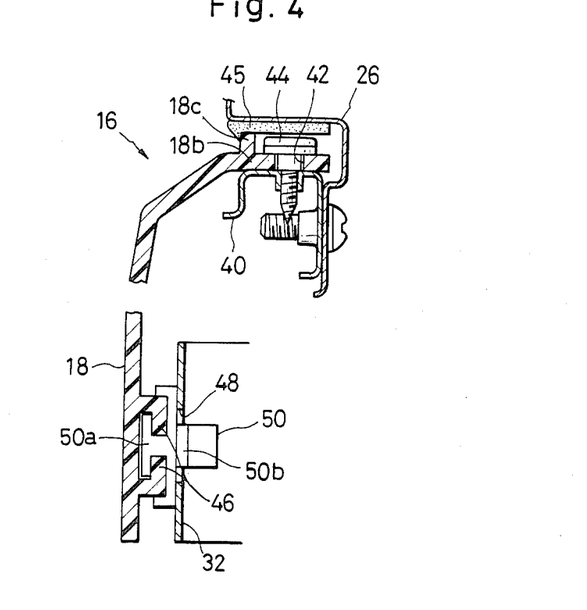
FIG. 4 is a vertical section taken along line IV—IV of FIG. 1, also showing the door and its associated members.

Further, as shown in FIG. 4, a beam 40 is rigidly connected to the reinforcing member 26 to extend in the longitudinal direction of the vehicle body 12. The door outer panel 18 includes a substantially horizontally extending top side 18b which is formed with an opening 42. A stepped bolt 44 is threaded into the beam 40 through the opening 42 of the panel top side 18b. In this manner, the panel top side 18b is fastened to the reinforcing member 26 at several horizontally spaced locations. Rear ones of such openings 42 in the door outer panel 18 are formed as circular holes and front ones as elongate slots which extend in the longitudinal direction of the vehicle body 12. In this configuration, a front portion of the flat top side 18b of the panel 18 is movable in the longitudinal direction but not in the vertical direction.

A lug 18c extends upwardly from an outer portion of the panel top side 18b so as to conceal the heads of the bolt 44. A cushioning material 45 is interposed between the lug 18c and the underside of the reinforcing member 26 to fill the space therebetween.

Figure 5:
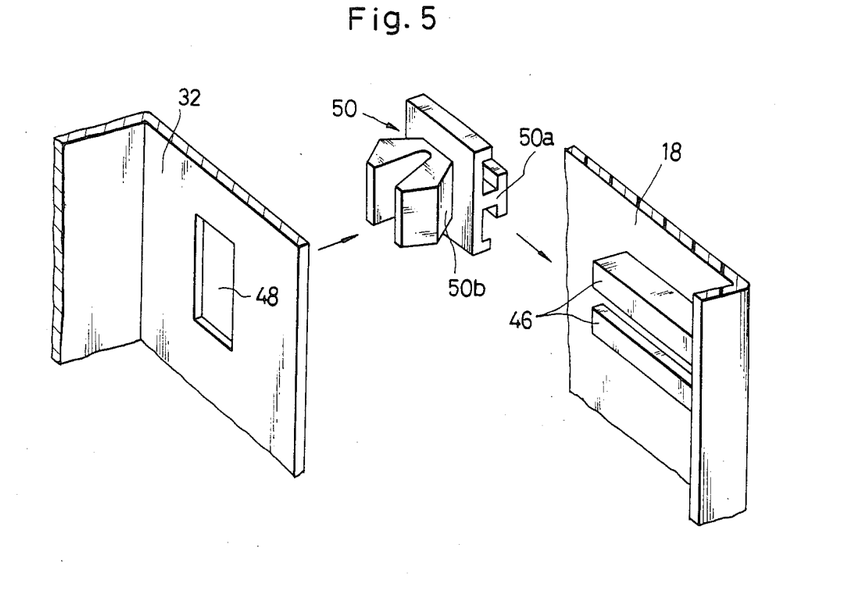
FIG. 5 is an exploded perspective view showing a structure of a slidable retaining portion adapted to retain an outer and an inner panels of the door.

As shown in FIGS. 3, 4 and 5, rails 46 are formed integrally with the door outer panel 18 on the back of a front lower portion of the latter. Extending longitudinally of the vehicle body 12, the rails 46 serve as a longitudinal guide as will be described. The door inner panel 32 is formed with a vertically extending guide slot, or vertical guide, 48 in a portion thereof which faces the rails 46. A clip 50 is engaged with both the rails 46 and the guide slot 48. Specifically, the clip 50 includes a longitudinal slide section 50a which is engaged with the rails 46 to be slidable therealong in the longitudinal direction, and a vertical slide section 50b which is engaged in the slot 48 to be slidable therealong in the vertical direction. The outer end of the slide section 50a and the inner end of the slide section 50b are each bulged in order to prevent the sections 50a and 50b from slipping out the rails 46 and guide slot 48, respectively.

The front fender panel 14 is mounted to a front bulk head or like rigid member of the vehicle body 12 by fixing means and slidable engaging means which are similar to those associated with the door outer panel 18 as stated above. Specifically, the upper and front edges of the panel 14 are fixed in position while the lower and rear edges are retained slidably in the vertical and longitudinal directions.

In the above construction, when the front fender panel 14 has undergone expansion or contraction due to temperature variation, its rear and lower edges slide in the longitudinal or the vertical direction. The panel 14 is configured such that even when it has undergone the maximum degree of expansion, it does not extend rearwardly beyond door hinges 52 (FIG. 2) which are mounted on the front end portion of the door inner panel 32.

As shown in FIG. 3, a screw grommet 56 is fitted to a center pillar 54 which is adapted to provide the vehicle body 12 with mechanical strength. A stepped tapping screw 58 is driven into the grommet 56 through an opening 60 which is formed through the front end side 20a of the rear fender panel 20. In this manner, the rear fender panel 20 is fastened to the center pillar 54 at several vertically spaced locations. Again, upper ones of such openings 60 in the panel 20 are in a form of circular holes while lower ones are in a form of vertically extending elongate slots. This allows a lower end portion of the panel front end side 20a to move in the vertical direction but not in the longitudinal direction.

A door lock mechanism 61 (FIG. 2) for locking the door 16 is disposed between the center pillar 54 to which the front side 20a of the rear fender panel 20 is fixed and the rear end of the door inner panel 32 to which the rear side 18a of the door outer panel 18 is fixed.

Figure 6:
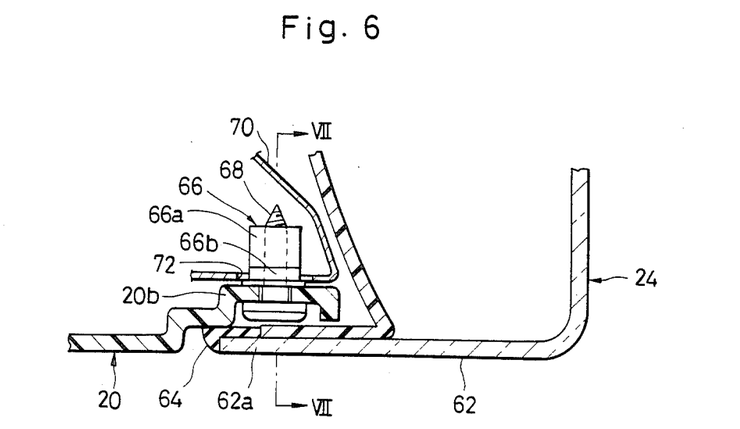
FIG. 6 is a fragmentary horizontal section taken along line VI—VI of FIG. 1, showing a rear part of a body of the motor vehicle.

As shown in FIG. 6, the rear end side 20b of the rear fender panel 20 is sequentially bent inwardly in a stepwise configuration. A cover 62 which serves as a lens of the rear combination lamp 24 has an extension 62a at a side portion thereof. The extension 62a is located to overlap the outer surface of the rear end side 20b of the rear fender panel 20. A rubber seal 64 is fitted to the tip of the cover extension 62a so as to prevent water and others from entering the vehicle body 12 through the gap between the cover 62 and the rear fender panel 20.

Figures 7, 8:
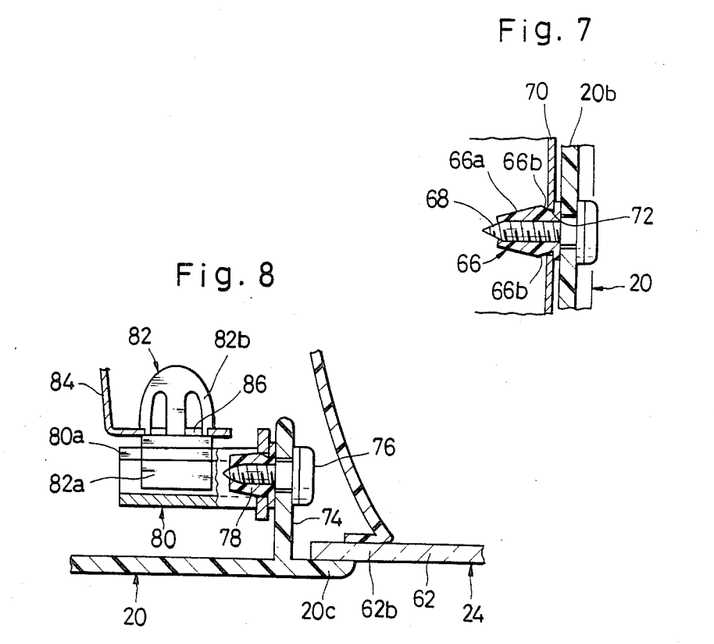
FIG. 7 is a vertical section taken along line VII—VII of FIG. 6.
FIG. 8 is a horizontal section similar to FIG. 6, showing another embodiment of the present invention.

As shown in FIGS. 6 and 7, a clip 66 is fitted by a stepped bolt 68 to the rear end side 20b of the rear fender panel 20 in such a manner as to protrude from the inner surface of the panel 20. The head of the bolt 68 is fully concealed by the cover 62 of the rear combination lamp 24. The clip 66 includes a locking portion 66a adjacent to the innermost end thereof, and recesses 66b which are respectively formed in the upper and lower portions of the clip 66. As the bolt 68 is tightened, the locking portions 66a of the clip 66 is enlarged in diameter. A member of the vehicle body 12 which is adapted for mechanical strength, implemented with a steel sheet and located to face the rear end side 20b of the rear fender panel 20, e.g., and inside panel 70 is formed with a longitudinally extending slot 72. The clip 66 is received in the slot 72 and, thus, slidable therealong in the longitudinal direction of the vehicle body 12. In this manner, the rear end side 20a of the rear fender panel 20 is longitudinally slidably retained by the inside panel 70 at the back of the extension 62a of the cover 62.

As the vehicle body 12 having the exterior panels 14, 18 and 20 as described above is subjected to high temperature such as under the blazing sun, the panels 14, 18 and 20 which are made of synthetic resins are expanded. Concerning the door outer panel 18, for example, the rear end side 18a and the top side 18b are respectively fixed in place in the longitudinal and the vertical directions, i.e., directions which are respectively perpendicular to the sides 18a and 18b, so the position of the panel 18 is unchanged relative to the front end side 20a of the rear fender panel 20 which faces the side 18a and the lower edge of the reinforcing member 26 which faces the side 18b. That is, the panel 18 is surely and accurately jointed to the panel 20 and reinforcing member 26. The expansion of the panel 18 is absorbed two-dimensionally by the rails 46 which slide forwardly relative to the clip 50, and the clip 50 which slide downwardly along the guide slot 48 of the door inner panel 32. Hence, the panel 18 is prevented from being undulated. Further, because the panels 18 and 32 are positively locked to each other by the clip 50, there is no fear of the panel 18 coming off the panel 32.

Meanwhile, when the door outer panel 18 is contracted as in cold weather, the contraction is absorbed by the rearward and the upward movements of the front lower portion of the panel 18. This frees the panel 18 from cracks despite low ambient temperatures.

Expansion and contraction of the door outer panel 18 as discussed above occur along the fixed rear end side 18a and the fixed top side 18b, too. Nevertheless, because a part of the openings 36 and 42 with which the tapping screw 38 and the bolt 44 are respectively associated is formed as elongate slots, expansion and contraction along the sides 18a and 18b are accommodated. Further, so long as a side which faces a particular side is slidable, the latter may be almost completely fixed in place. Therefore, the sides 18a and 18b may each be completely fixed at several points thereof.

Expansion and contraction of the front fender panel 14 are accommodated in the same manner as those of the door outer panel 18. Upon expansion of the panel 14, the rear edge of the panel 14 is extended rearwardly. As previously stated, the rear end portion of the front fender panel 14 is offset outwardly of the vehicle body 12 relative to the front end portion of the door outer panel 18 which is another exterior panel neighboring the panel 14. Hence, the rear edge of the panel 14 is extended in a plane which is different from that of the panel 18 and, thereby, prevented from making contact with the panel 18. Such eliminates the need for a conspicuous clearance otherwise required between the panels 14 and 18.

Because the expansion of the front fender panel 14 is absorbed by the rear end portion of the panel 14 as stated above, it is allowable to firmly fix the front end portion of the panel 14 in place. This makes it possible to maintain in predetermined positions those regions of the front end portion of the panel 14 which are to be jointed to the front lamp 22, a front grill, an end portion of a hood, etc.

Due to the overlapping arrangement of the rear end portion of the front fender panel 14 and the front end portion of the door outer panel 18, no conspicuous clearance is developed between the panels 14 and 18 even if the panel 14 is contracted in cold weather. Furthermore, the panel 14 which is offset outwardly relative to the panel 18 serves to prevent water, pebbles and others which may be sent flying during travel of the vehicle 10 from entering the vehicle body 12 through the clearance otherwise developed.

When the door outer panel 18 is expanded, its front edge is extended forwardly with the result that the front end portion of the panel 18 is caused to slide at a position inwardly of the rear end portion of the front fender panel 14. The panels 18 and 14 are therefore restrained from abutting against each other or affecting each other due to expansion.

The rear end side 18a of the door outer panel 18 and the front end side 20a of the rear fender panel 20 are respectively fixed to the door inner panel 32 and the center pillar 54, which are rigid members of the vehicle body 12. Hence, a predetermined distance can be constantly defined between the rear edge of the panel 18 and the front edge of the panel 20. This eliminates interference of the panel 18 with the panel 20 otherwise caused by expansion of the panel 18.

Further, because the expansion and contraction of the panels 14 and 18 which are made of synthetic resins are absorbed at their mating portion, attractive appearance of the vehicle 10 is preserved.

When the rear fender panel 20 undergoes expansion, its rear end side 20b is extended rearwardly since the front end side 20a is fixed in place. This expansion is accommodated by the clip 66 adapted to retain the panel rear end side 20b; the clip 66 sliding rearwardly along the slot 72 of the inside panel 70. Consequently, the rear fender panel 20 is prevented from being undulated. In addition, because the panel rear end side 20b and the cover 62 of the rear combination lamp 24 overlap each other, they do not abut against each other despite the rearward extension of the panel 20.

As the rear fender panel 20 is contracted due to low ambient temperature, the clip 66 is caused to slide forwardly along the slot 72 of the inside panel 70 thereby accommodating the contraction. Again, no clearance is developed between the panel 20 and the cover 62 of the rear lamp 24 since the panel rear end side 20b and the cover 62 overlap each other.

Figure 9:
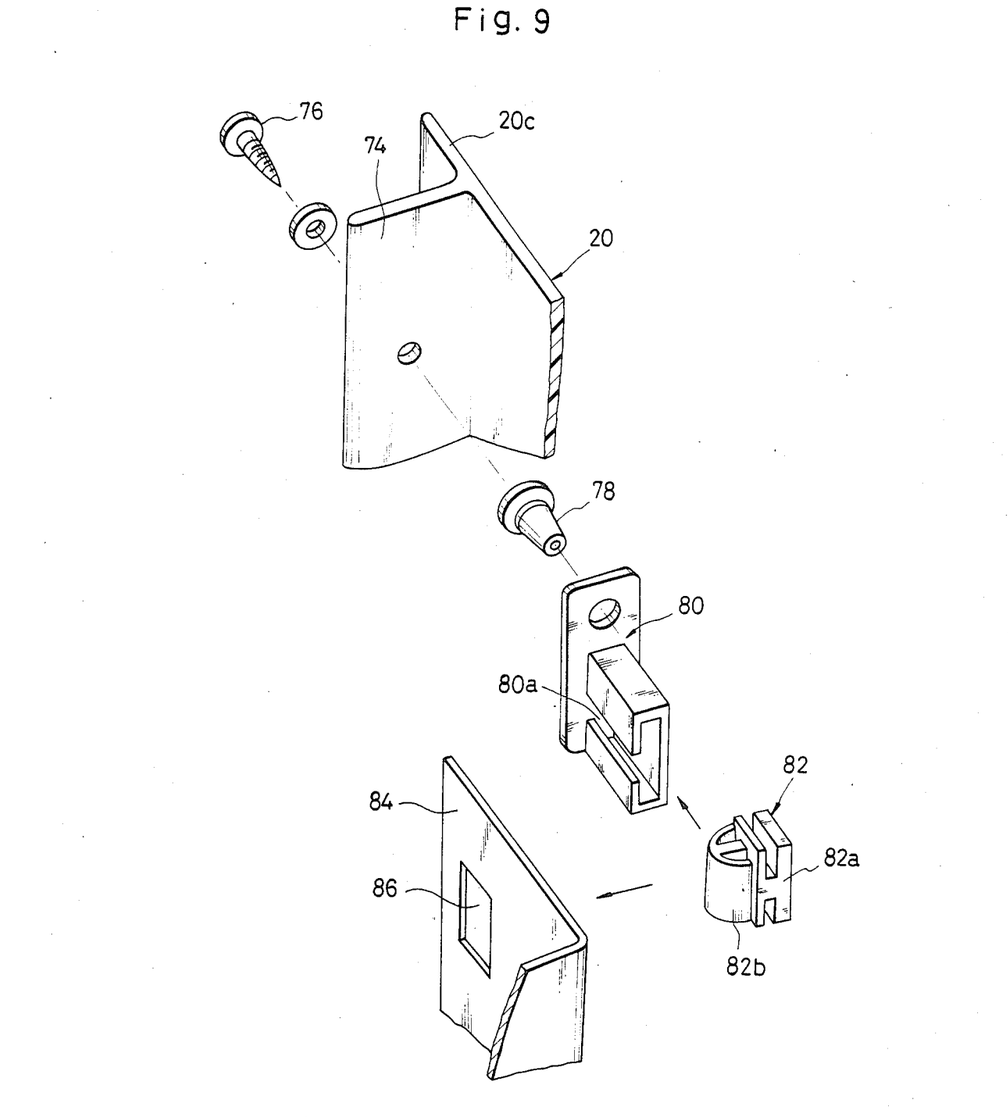
FIG. 9 is an exploded perspective view of a slidable retaining portion which is shown in the embodiment of FIG. 8.

Referring to FIGS. 8 and 9, another embodiment of the present invention is shown which pertains particularly to the structure for slidably supporting the rear end side 20b of the rear fender panel 20. In this particular embodiment, a panel rear end side 20c overlaps an extension 62b of the cover 62 of the rear lamp 24 from outside. A wall 74 adapted for reinforcement extends inwardly from a position of the panel rear end side 20c which is somewhat close to the front end. A rail member 80 is fixed to the wall 74 by a tapping screw 76 and a screw grommet 78. As shown, the rail member 80 is provided with a longitudinally extending groove 80a. A clip 82 having a slider member 82a is slidably received in the groove 80a. The clip 82 is retained by an inside panel 84 with an engaging portion 82b thereof received in an opening 86 of the inside panel 84. The inside panel 84 is another member of the vehicle body 12 adapted for mechanical strength and implemented with a steel sheet.

In the construction shown in FIGS. 8 and 9, as the rear fender panel 20 is expanded or contracted, the rail member 80 slides in the longitudinal direction relative to the clip 82 so as to accommodate the expansion or contraction. Again, because the panel rear end side 20c and the cover extension 62b overlap each other, they are prevented from abutting against each other or allowing a clearance from being developed therebetween. Furthermore, because the whole structure adapted to slidably support the panel rear end portion 20c is situated inwardly of the panel 20, it does not degrade the appearance of the vehicle 10.

In the foregoing embodiments, the front fender panel 14 and the rear fender panel 20 are each fixed in place along the front edge while the door outer panel 18 is fixed along the rear edge. However, each panel may be fixed along any of the opposite edges depending on which one of the opposite edges should be positioned with greater accuracy than the other. As regards the front fender panel 14, for example, where it is desired to position the rear edge of the panel 14 with greater accuracy relative to the front edge of the door outer panel 18 due to particular conditions of the door 16, the panel 14 may be fixed along the rear edge and made slidable along the front edge. In such a case, mating of the front edge of the panel 14 with the front lamp 22 may be implemented using the same structure as the one applied to the rear fender panel 20 and rear lamp 24.

It is to be noted that the present invention is applicable not only to a two-door vehicle as shown and described in relation to the preferred embodiments but also to a four-door vehicle and others. Furthermore, while all the panels 14, 18 and 20 have been shown and described as being made of synthetic resins, only one of them may be made of synthetic resin.

What is claimed is:

1. A body structure of a motor vehicle, comprising:
    a front fender panel made of synthetic resin and mounted on the outside of a strength member which provides the vehicle body with mechanical strength; and
    a door positioned next to and rearwardly of said front fender panel and consisting of a door inner panel made of a rigid material and a door outer panel fitted to the outside of said door inner panel;
    said front fender panel being fixed at a front end portion thereof to said strength member in a longitudinal direction of the vehicle body and retained at a rear end portion by said strength member slidably in the longitudinal direction, said rear end portion of said front fender panel being offset in an inward-outward direction of the vehicle body relative to a front end portion of said door outer panel.

2. A body structure as claimed in claim 1, wherein said door comprises a front-hinge type door, said door outer panel being offset at said front end portion inwardly of the vehicle body relative to said rear end portion of said front fender panel.

3. A body structure as claimed in claim 1, wherein said rear end portion of said front fender panel overlaps said front end portion of said door outer panel.

4. A body structure of a motor vehicle, comprising:
    a front fender panel mounted on the outside of a strength member which provides the vehicle body with mechanical strength; and
    a front-hinge type door positioned next to and rearwardly of said front fender panel and consisting of a door inner panel made of a rigid material and a door outer panel made of synthetic resin and fitted to the outside of said door inner panel;
    said door outer panel being fixed at a rear end portion thereof to said door inner panel in a longitudinal direction of the vehicle body and retained at a front end portion by said door inner panel slidably in the longitudinal direction, said front end portion of said door outer panel being offset in an inward-outward direction of the vehicle body relative to a rear end portion of said front fender panel.

5. A body structure as claimed in claim 4, wherein said front end portion of said door outer panel is offset inwardly of the vehicle body relative to said rear end portion of said front fender panel.

6. A body structure as claimed in claim 4, wherein said front end portion of said door outer panel overlap said rear end portion of said front fender panel.

7. A body structure of a motor vehicle, comprising:
    a front fender panel made of synthetic resin and mounted on the outside of a strength member which provides the vehicle body with mechanical strength; and
    a front-hinge type door positioned next to and rearwardly of said front fender panel and consisting of a door inner panel and a door outer panel mounted on the outside of said door inner panel, said door inner panel being made of a rigid material and said door outer panel being made of synthetic resin;
    said front fender panel being fixed at a front end portion thereof to said strength member in a longitudinal direction of the vehicle body and retained at a rear end portion by said strength member slidably in the longitudinal direction, said door outer panel being fixed at a rear end portion thereof to said door inner panel in the longitudinal direction and retained by said door inner panel slidably in the longitudinal direction, said rear end portion of said front fender panel and said front end portion of said door outer panel being offset in an inward-outward direction of the vehicle body relative to each other.

8. A body structure as claimed in claim 7, wherein said rear end portion of said front fender panel is offset outwardly of the vehicle body relative to said front end portion of said door outer panel.

9. A body structure as claimed in claim 7, wherein said rear end portion of said front fender panel and said front end portion of said door outer panel overlap each other.

10. A body structure of a motor vehicle, comprising:
a plurality of exterior panels located side by side to constitute an exterior of the vehicle body, at least one of said exterior panels being made of synthetic resin;
rigid members to which said exterior panels are mounted;
said exterior panel made of resin having two contiguous sides which are individually fixed to said rigid members in directions perpendicular to said sides;
a longitudinally extending first guide portion located on the inside of said exterior panel made of resin and remote from said fixed sides of said panel;
a second guide portion provided on said rigid member and being oriented perpendicular to said first guide portion; and
a clip engaged with said first and second guide portions so that said exterior panel made of resin is retained slidably in mutually perpendicular directions by said rigid members in at least one location of said exterior panel remote from said fixed sides;
an end portion of any of slidable sides of said exterior panel made of resin which adjoins another exterior panel being offset in an inward-outward direction of the vehicle body relative to an end portion of another said exterior panels.

11. A body structure as claimed in claim 10, wherein said exterior panel made of resin comprises any one of a front fender panel, a door outer panel and a rear fender panel and is fixed at a top side and one of sides which oppose each other in the longitudinal direction of the vehicle in a vertical direction and the longitudinal direction, respectively.

12. A body structure of a motor vehicle, comprising:
a door consisting of a door inner panel made of a rigid material and a door outer panel which is mounted on the outside of said door inner panel;
a rear fender panel located next to and rearwardly of said door and mounted on the outside of a strength member which provides the vehicle body with mechanical strength, said rear fender panel being made of synthetic resin; and
a lamp cover located next to and rearwardly of said rear fender panel to constitute a side of a rear lamp;
said rear fender panel being fixed at a front end portion thereof to said strength member in a longitudinal direction of the vehicle body and retained at a rear end portion by said strength member slidably in the longitudinal direction, said lamp cover being extended forwardly at a front end portion thereof, said front end portion of said lamp cover and said rear end portion of said rear fender panel being laid one upon the other in an inward-outward direction of the body of the motor vehicle.

* * * * *